No. 808,411. PATENTED DEC. 26, 1905.
W. M. VENABLE.
LIQUID AERATING DEVICE.
APPLICATION FILED NOV. 15, 1904.

2 SHEETS—SHEET 1.

Witnesses
John H Duvall
M. Turner

William M. Venable
Inventor
by Benjamin Price
Attorney

No. 808,411. PATENTED DEC. 26, 1905.
W. M. VENABLE.
LIQUID AERATING DEVICE.
APPLICATION FILED NOV. 15, 1904.
2 SHEETS—SHEET 2.
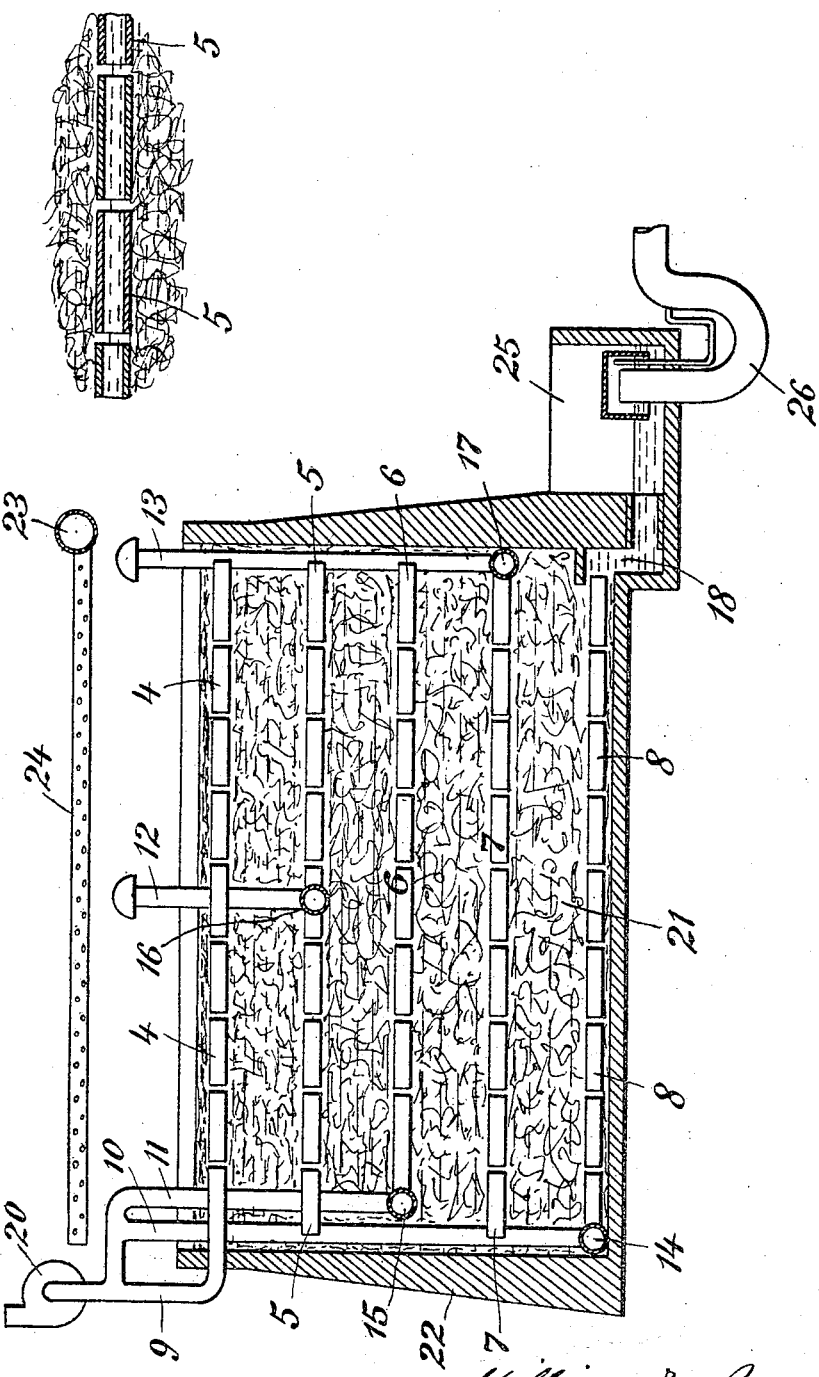

UNITED STATES PATENT OFFICE.

WILLIAM MAYO VENABLE, OF CINCINNATI, OHIO, ASSIGNOR TO SANITARY ENGINEERING COMPANY, A CORPORATION OF NEW YORK.

LIQUID-AERATING DEVICE.

No. 808,411.          Specification of Letters Patent.          Patented Dec. 26, 1905.

Application filed November 15, 1904. Serial No. 232,815.

*To all whom it may concern:*

Be it known that I, WILLIAM MAYO VENABLE, a citizen of the United States, and a resident of Cincinnati, Hamilton county, in the State of Ohio, have invented a new and useful Improvement in Liquid-Aerating Devices, of which the following is a full description.

My invention applies to the aeration of liquids in general, and especially to them when contained in filters, percolating or contact beds when acted upon either by mechanical or biological processes.

In another application, filed November 15, 1904, for an apparatus for aerating polluted liquids and bearing the Serial No. 232,816 I have described an invention which shows devices and mechanisms for aerating polluted liquids in which fresh air is drawn into the beds and foul air expelled, actuated by the falling of the liquid in the beds, and in this application I describe other and different means for drawing air through the bed, either in conjunction with the weight of the liquid or independent of it, combining these means with definite channels admitting the fresh air to the beds, the fresh air being kept uncontaminated by the foul air drawn off. By the use of this invention such beds may be made much deeper than those ordinarily used.

The accompanying drawings illustrate the invention, of which—

Figure 1:
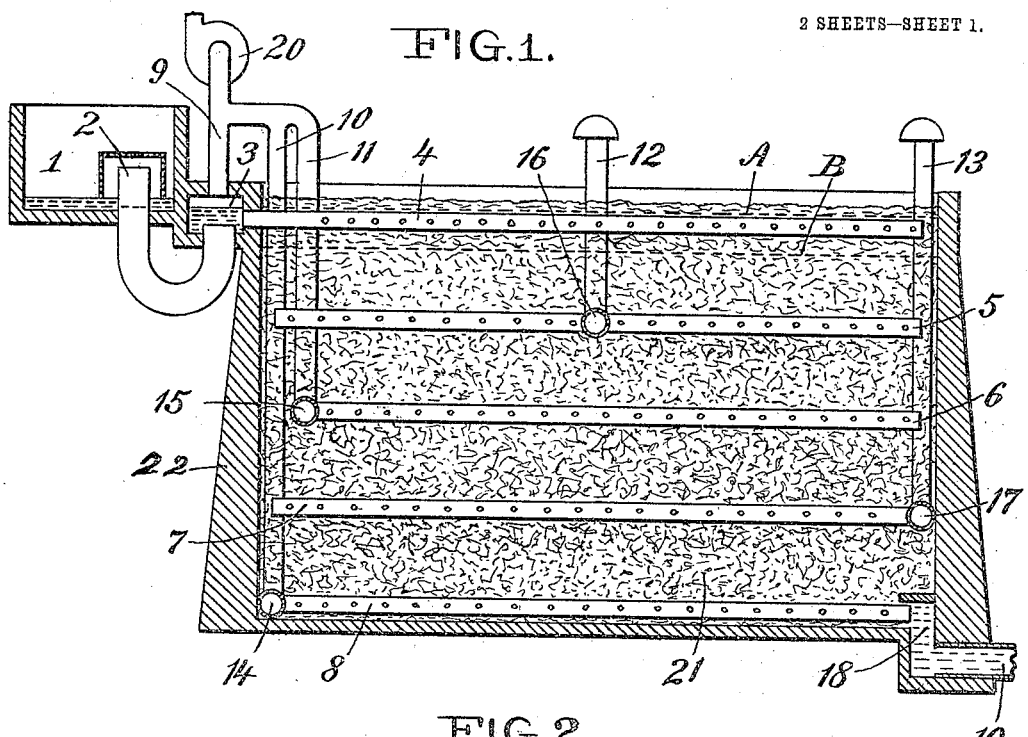
Figure 2:
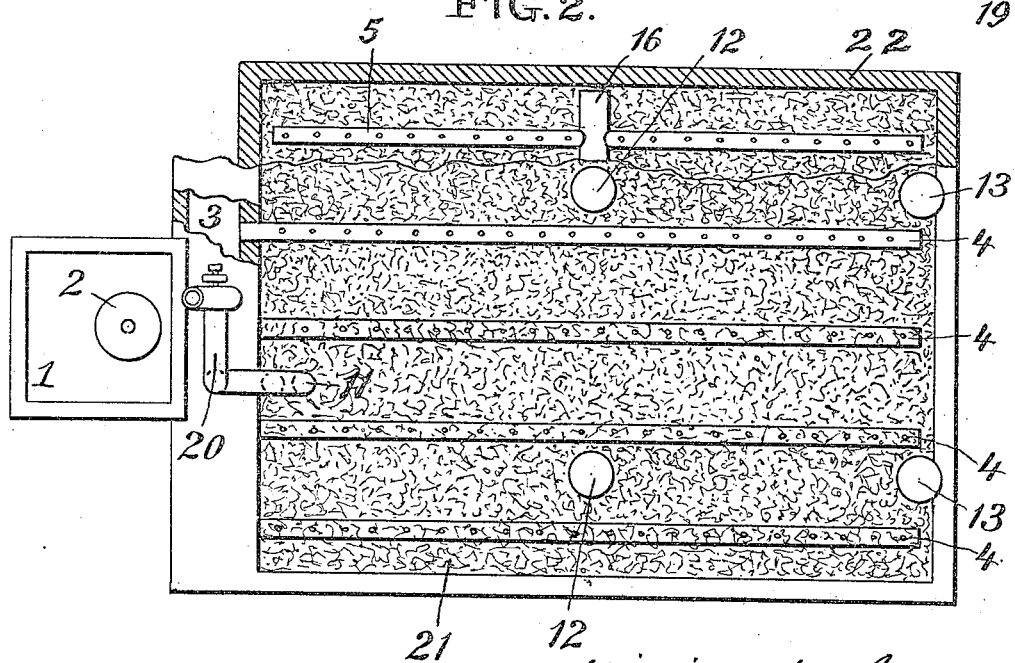

Figure 1 is a vertical section of a deep contact or filter bed provided with the devices for aerating the liquid and drawing off the foul odors. Fig. 2 is a plan view of the same, partly in section, to show the location of a set of pipes below the set at the top. Fig. 3 is a vertical section of a filter-bed, showing a perforated pipe above the bed to distribute the liquid over the surface and adapted to receive and discharge the liquid intermittently. Fig. 4 shows a pipe constructed in disjointed sections to be used instead of a perforated pipe, if desired.

22 represents the walls of a suitable receptacle within which is placed coarse sand, gravel, or other suitable material 21 for a contact or filter bed and adapted to harbor and protect the aerobic bacteria resident therein. Throughout this bed are laid a series of pipes in sets, (shown at 4, 5, 6, 7, and 8.) The sets are located at a distance apart from each other to insure a supply of air to the beds at the points throughout the material where it is most needed. The sets may be multiplied to suit a receptacle of any depth or capacity without altering the principle or mode of operation of the device. The pipes of each set are connected by a header or headers, as shown at 3, 16, 15, 14, and 17—the pipe 4 to the header 3, 5 to 16, 6 to 15, 7 to 17, and 8 to 14. The device is also provided with the vent-tubes 12 and 13 for the admission of fresh air to the material. The vent 12 is connected with the header 16 and the vent 13 with the header 17. The pipes for drawing off the foul air are shown in the drawings at 9, 10, and 11. The pipe 9 is connected with the header 3 and pipes 4, the pipe 10 with the pipes 8 and header 14, the pipe 11 with 6 and header 15. Any of the well-known means for producing a draft in the pipe 9 will draw off the foul air from 9, 10, and 11, which are connected together, as shown, and consequently from the bed. One means for producing a draft is shown at 20, which is intended to represent an ordinary fan.

Fig. 3 of the drawings shows a form of the invention in which the liquid from a supply-pipe 23 flows into a perforated pipe 24, located above the bed, and may be called a "dripping" device, from which the liquid drips continuously upon the surface of the bed. The figure also shows a chamber 25 provided with a discharge-siphon 26 to discharge the liquid from the bed when it reaches a desired level. When the apparatus is constructed in this form, the bed will receive the liquid continuously and discharge it intermittently.

The pipes constituting the several sets may be formed in short pieces or in a single piece and perforated, as shown in the drawings.

1 is a tank in which the sewage or polluted liquid is discharged.

2 represents one of the well-known siphon devices for discharging the liquid intermittently in doses when the liquid in tank 1 rises to a given point to actuate the siphon. When a sufficient dose is collected, the siphon discharges it into the header 3, which is connected with all of the pipes of the set 4. The liquid is distributed evenly from the pipes 4 over the top of the bed and occupies a space approximately represented between the lines A B, filling the interstices of the bed within this space. This stratum or layer of liquid percolates or seeps downwardly through the material of the bed and is aerated by the air contained in the interstices of the material 21 until it is discharged through the header 18 and pipe 19. These interstices are supplied with air, as already described, through the piping system connected with the fresh-air inlets 12 and 13.

The number of sets of pipes, as well as headers, vents, &c., may be increased as occasion requires.

It is obvious that the discharge from the beds may be continuous, as shown, or by arranging at the discharge-outlet any of the automatic discharging devices, as shown in Fig. 3, the liquid may be discharged intermittently.

It is not essential to the invention that the dose should be used. Any other method of distributing the liquid into the bed uniformly will answer the purpose, and it is obvious that the system does not depend upon the dose to cause a circulation of air. It is a positive system induced by the pipes and arrangements, as shown, for introducing and circulating the air in one direction throughout the bed.

What I claim is—

In a liquid-aerating device a bed of material adapted to receive the liquid and to allow it to percolate downward, means for distributing the liquid in the upper portion of the bed and means for withdrawing the liquid from the lower portion of the bed, in combination with sets of channels embedded in the bed at different elevations and provided with openings into the bed, alternate sets connected to fresh-air inlets and the other sets to an exhaust or draft that operates continually, drawing air through the material composing the bed between the sets of channels.

In testimony whereof I have signed my name to this specification in the presence of two subscribing witnesses.

WILLIAM MAYO VENABLE.

Witnesses:
L. A. MELLO,
GEORGE A. SCHILLO.